(12) United States Patent
King

(10) Patent No.: US 11,802,003 B1
(45) Date of Patent: Oct. 31, 2023

(54) CONVEYOR BELT CLEANING SYSTEM

(71) Applicant: Jim E. King, Bienfait (CA)

(72) Inventor: Jim E. King, Bienfait (CA)

(*) Notice: Subject to any disclaimer, the term of this patent is extended or adjusted under 35 U.S.C. 154(b) by 0 days.

(21) Appl. No.: 17/750,776

(22) Filed: May 23, 2022

Related U.S. Application Data

(60) Provisional application No. 63/191,466, filed on May 21, 2021.

(51) Int. Cl.
| B65G 45/22 | (2006.01) |
| B65G 45/16 | (2006.01) |
| B65G 45/26 | (2006.01) |
| B65G 45/24 | (2006.01) |

(52) U.S. Cl.
CPC ............ B65G 45/22 (2013.01); B65G 45/16 (2013.01); B65G 45/24 (2013.01); B65G 45/26 (2013.01)

(58) Field of Classification Search
CPC ........ B65G 45/22; B65G 45/16; B65G 45/26; B65G 45/12; B65G 45/18
See application file for complete search history.

(56) References Cited

U.S. PATENT DOCUMENTS

| 3,998,321 A | | 12/1976 | Schultz | |
| 4,860,883 A | * | 8/1989 | Knaul | B65G 45/22 |
| | | | | 198/495 |
| 4,960,200 A | * | 10/1990 | Pierce | B65G 45/24 |
| | | | | 198/502.1 |
| 5,355,992 A | * | 10/1994 | Baig | B65G 45/22 |
| | | | | 198/497 |
| 6,971,503 B2 | | 12/2005 | Thompson | |
| 8,191,701 B2 | * | 6/2012 | Bryl | B65G 45/22 |
| | | | | 198/495 |
| 8,297,435 B2 | | 10/2012 | Lathem | |
| 8,978,875 B2 | * | 3/2015 | Barboni | B65G 45/22 |
| | | | | 198/497 |
| 9,096,392 B1 | | 8/2015 | Barragan | |
| 10,046,920 B1 | | 8/2018 | Green | |
| 10,266,348 B1 | | 4/2019 | Yoo | |
| 10,710,813 B2 | | 7/2020 | Kenowski | |
| 11,565,887 B2 | * | 1/2023 | Meyers | B65G 39/073 |
| 2001/0023814 A1 | | 9/2001 | Franzoni et al. | |
| 2019/0344973 A1 | * | 11/2019 | Rogan | B65G 45/26 |

* cited by examiner

*Primary Examiner* — Mark A Deuble
(74) *Attorney, Agent, or Firm* — CRAMER PATENT & DESIGN, PLLC; Aaron R. Cramer

(57) ABSTRACT

The conveyor belt cleaning system is an add-on apparatus for a grocery store checkout conveyor. The device automatically dispenses a disinfectant liquid on the underside of the belt in a continuous manner. The disinfectant is pumped from an open rectangular reservoir that is the same width as the belt. An electric pump dispenses the disinfectant from at least one spray nozzle at the leading edge of the reservoir. A squeegee is secured at the trailing edge of reservoir removes excess disinfectant which in turn falls back into the reservoir for reuse.

16 Claims, 3 Drawing Sheets

CONVEYOR BELT CLEANING SYSTEM

RELATED APPLICATIONS

The present invention is a continuation of U.S. Provisional Application No. 63/191,466 filed on May 21, 2021, the entire disclosures of which are incorporated herein by reference.

FIELD OF THE INVENTION

The present invention relates generally to a cleaning and sanitizing system for continuously-run conveyor belt assemblies.

BACKGROUND OF THE INVENTION

Everyone has experienced placing food products on a grocery store checkout conveyor that has been less than ideally clean. While physical dirt is upsetting enough, we should be more cautious of the unseen dangers of germs and bacteria. These germs and bacteria can cause such illnesses as Escherichi coli, Salmonella bongori, Salmonella enterica, and other such diseases. Also, meat juices that may leak from packaged meat items may cause illnesses such as trichinosis and the like. Most times, packaging material such as plastic or cardboard protect the food from such dangers, but other foods such as fruits and vegetables are often placed on the conveyor directly.

While these items are usually washed before consumption, traces of germs and/or bacteria may linger. Even food products inside of a container can be contaminated by the conveyor belt, such as a can of soda pop which is usually drunk from directly without washing. These same problems exist on conveyor belts used at meat packaging plants and the like as well. Accordingly, there exists a need for a means by which food products can be protected from germs, viruses, and bacteria while being placed on a conveyor belt. The use of the belt scrubber system allows one to safely place food and food containers onto a grocery checkout belt or similar location without worrying about contracting a life-threatening illness.

SUMMARY OF THE INVENTION

The principles of the present invention provide for a conveyor belt cleaning system having a reservoir retaining a cleaning solution, a manifold delivering the cleaning solution to a conveyor belt—the manifold includes a plurality of nozzles, each directed towards the conveyor belt, a pump transferring the cleaning solution from the reservoir to the manifold—the pump is mounted to a ground or other support structure adjacent to the reservoir in electrical communication with an electrical power source, a scrub body contacting the conveyor belt, a basin mounted to the frame of the conveyor belt directly subjacent to an area for cleaning the conveyor belt, a containment shroud collecting a plurality of dirty cleaning solution—the containment shroud is mounted to a top perimeter of the basin—the containment shroud flares vertically outward about a perimeter, such that an upper edge thereof has a plurality of wider dimensions than a lower edge, a filter cleaning the dirty cleaning solution to produce a plurality of return cleaning solution for transfer back to the reservoir, a filter box located outside of the basin, the filter box includes a filter box inlet side that is in fluid communication with the drain, and a pair of scrub arms rigidly attached to the elongated plate at a bottom end thereof and are also of a similar width thereto.

The reservoir may include a fill port located thereon. The reservoir may include an access port for cleaning or other maintenance. The reservoir may be mounted to or resting on a floor nearby the conveyor belt. The conveyor belt may be 2 feet long. The basin may have an open top, sidewalls, and a bottom, and has a width that is slightly greater than a width of the conveyor belt. The basin may be sloped towards a drain. The filter may be removably placed within the filter box such that it is also in fluid communication with the drain. A reservoir inlet may be in a fluid conveyance feature that has a first side in fluid communication with a filter box outlet side. A second side of the reservoir inlet may be in fluid communication with the reservoir. The containment shroud may include a perforated mesh bottom within the perimeter.

The containment shroud may include an open bottom within the perimeter. A height of the containment shroud may terminate prior to contact with the conveyor belt. A scrub assembly may be mounted to an interior bottom surface of the bottom of the containment shroud with at least one spring. The scrub assembly may include a planar elongated plate which is attached to a first end of each spring and the second end of each spring is affixed to the interior bottom of the containment shroud. The elongated plate may have a width equal to or slightly greater than the width of the conveyor belt and resides fully within the containment shroud. The pair of scrub arms may each be oriented at a forward angle relative to perpendicularly vertical from the elongated plate. A pump inlet may be in fluid communication between the inlet of the pump and the reservoir, and a pump outlet is in fluid communication between an outlet of the pump and an inlet of the manifold. The electrical power source may include a ground fault interrupter. The pump may include a continuous duty pump motor.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
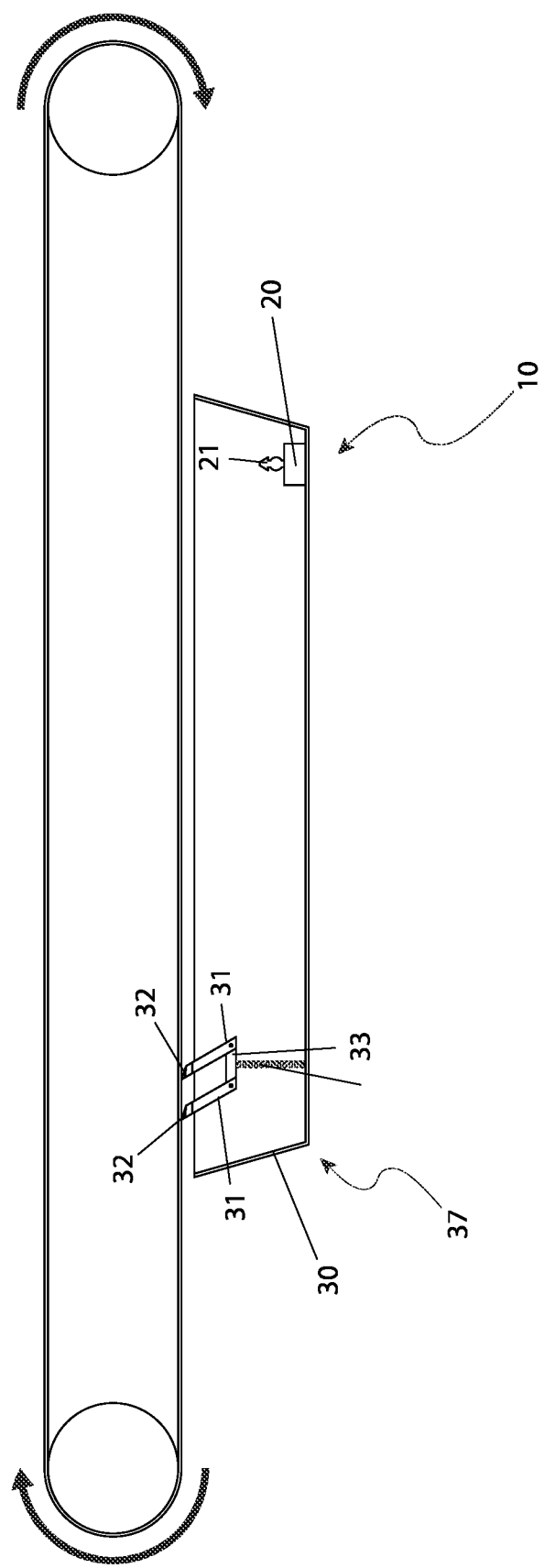
FIG. 1 is a side cross-sectional view of a conveyor belt cleaning system, according to the preferred embodiment of the present invention.

DESCRIPTIVE KEY 10 conveyor belt cleaning system
11a pump inlet
11b pump outlet
12 pump
15 reservoir
20 manifold
21 nozzle
30 containment shroud
31 scrub arm
32 wear strip
33 elongated plate
34 spring 35 basin
36 drain
37 scrub body
40 filter box
41 filter
42 reservoir inlet
50 belt
60 cleaning solution
65 return cleaning solution
70 power cord
75 electrical power source
80 power switch
85 grounding connection
90 pump motor

DESCRIPTION OF THE INVENTION

Figure 2:
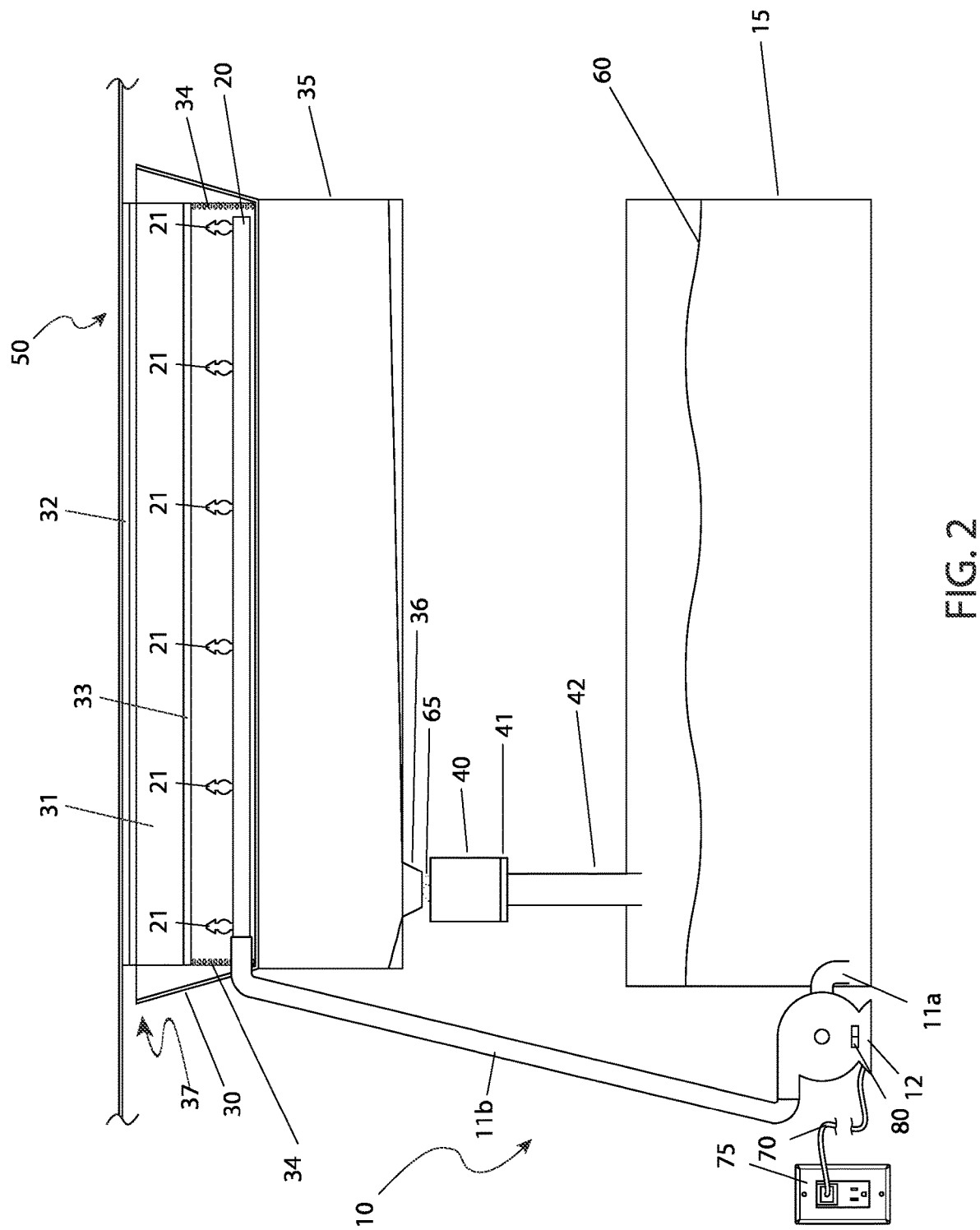
FIG. 2 is a side cross-sectional view of the conveyor belt cleaning system, according to the preferred embodiment of the present invention.
Figure 3:
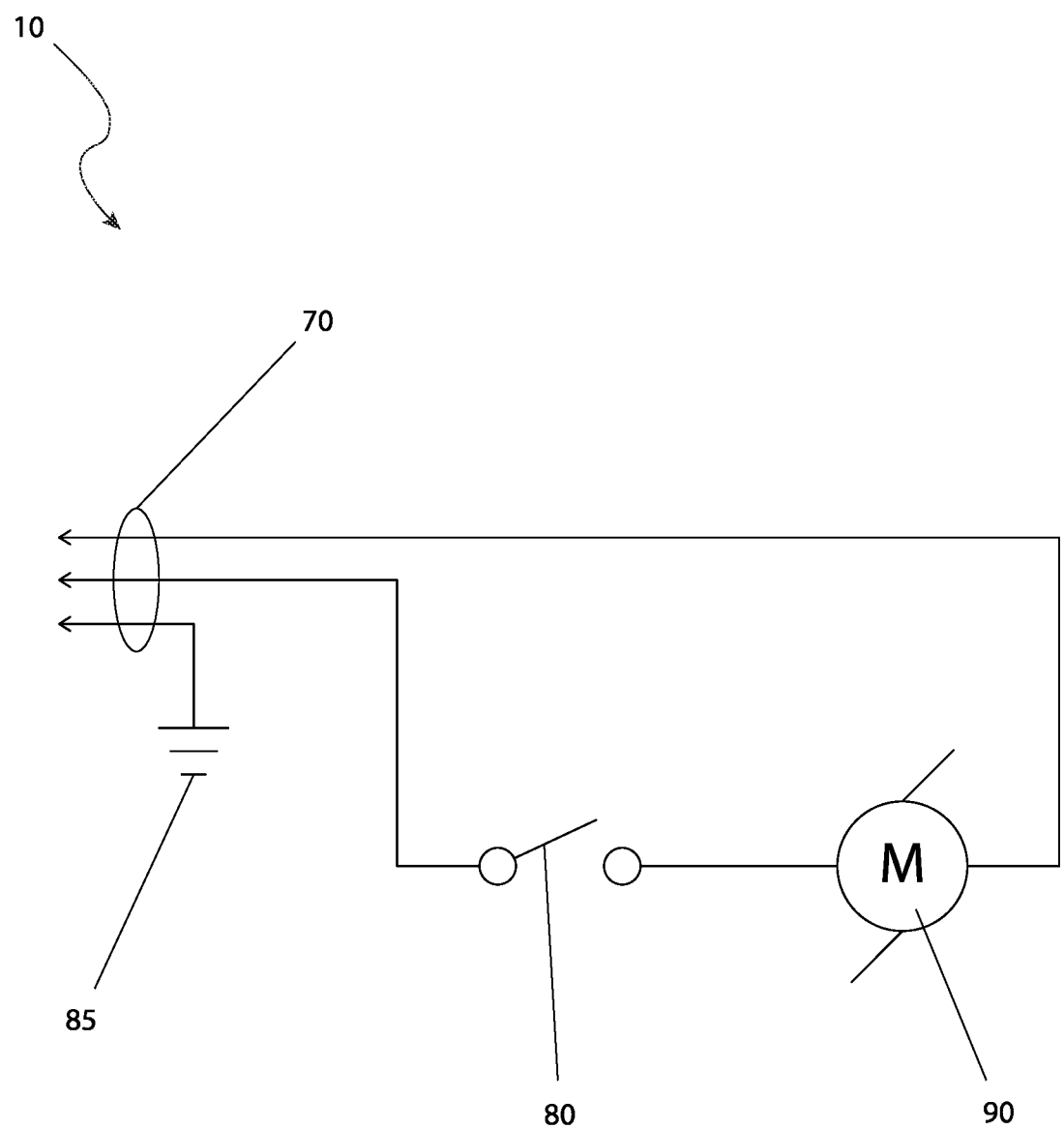
FIG. 3 is an electrical schematic of the conveyor belt cleaning system, according to the preferred embodiment of the present invention.

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring to FIGS. 1 and 2, a side and a front view of the conveyor belt cleaning system 10 is herein disclosed. The conveyor belt cleaning system (herein described as the "system") 10, is envisioned to be a retrofit assembly for any type or size of conveyor belt 50 in any industry. The overall purpose of the system 10 is to provide an effective and resilient cleaning effort to the conveyor belt 50 and is particularly suited for such a conveyor belt 50 that is in continuous operation. The system 10 can be installed either permanently or temporarily to an existing conveyor belt 50, or it can be fabricated during initial construction of the conveyor belt 50. The system 10 itself is capable of being run automatically in conjunction with the operation of the conveyor belt 50, automatically when activated, or as an on-demand activation when desired.

Referring now more closely to FIG. 2, it is shown that the system 10 includes a reservoir 15 capable of retaining a cleaning solution 60, a manifold 20 for delivering the cleaning liquid to the belt 50, a pump 12 for transferring the cleaning solution 60 from the reservoir 15 to the manifold 20, a scrub arm 31 for contacting the belt 50, a containment shroud 30 for collecting dirty cleaning solution 60, and a filter 41 for cleaning the dirty cleaning solution to produce return cleaning solution 65 for transfer back to the reservoir 15. Also disclosed is a scrub body 37 (shown also in FIG. 1) which includes the scrub arm(s) 31, the wear strip(s) 32, the elongated plate 33, and the spring(s) 34.

The reservoir 15 is preferably a containment vessel capable of holding an amount of a cleaning liquid therein. The reservoir 15 may have a fill port located thereon and an access port for cleaning or other maintenance. The reservoir 15 is preferably mounted to or resting on the floor nearby the belt 50, generally in the same location as the location of the desired cleaning area for the belt 50, such as directly subjacent thereto.

A basin 35 is preferably mounted to the frame of the conveyor belt 50 directly subjacent to the desired area for cleaning of the belt 50. The basin 35 has an open top, sidewalls, and a bottom, and has a width that is slightly greater than the width of the belt 50 and a length of around two feet (2 ft.). The interior bottom surface of the basin 35 is preferably sloped towards a drain 36. A filter box 40 is located exterior from the basin 35 and has a filter box inlet side that is in fluid communication with the drain 36. A filter 41 is envisioned to be removably placed within the filter box 40 such that it is also in fluid communication with the drain 36. A reservoir inlet 42 is a fluid conveyance feature, such as a pipe or tubing, that has a first side in fluid communication with a filter box outlet side. The second side of the reservoir inlet 42 is in fluid communication with the reservoir 15.

Mounted to a top perimeter of the basin 35 is a containment shroud 30. The containment shroud 30 flares vertically outward about the entire perimeter, such that the upper edge thereof has wider dimensions than the lower edge. The bottom of the containment shroud 30 may be perforated, mesh, or totally open within a perimeter of about one inch (1 in.). The height of the containment shroud 30 is such that it terminates prior to contact with the belt 50. A scrub assembly is mounted to an interior bottom surface of the bottom of the containment shroud 30 with at least one (1) spring 34. The scrub assembly includes a planar elongated plate 33 which is attached to a first end of each spring 34; the second end of each spring 34 is affixed to the interior bottom of the containment shroud 30. The elongated plate 33 has a width equal to or slightly greater than the width of the belt 50 and resides fully within the containment shroud 30. A pair of scrub arms 31 are each rigidly attached to the elongated plate 33 at a bottom end thereof and are also of a similar width thereto. The pair of scrub arms 31 are each oriented at a forward angle relative to perpendicularly vertical from the elongated plate 33 (i.e., forwards towards the front of the containment shroud 30). Removably attached to each upper end of the pair of scrub arms 31 is an individual wear strip 32 (please see FIG. 1).

The manifold 20 is routed through the containment shroud 20 at a rear location thereof, and adjacent the interior bottom thereof. In fluid communication with the manifold 20 is a plurality of nozzles 21, each directed towards the belt 50. A pump 12 is mounted to the ground or other support structure preferably adjacent to the reservoir 15 an in electrical communication with an electrical power source 75. A pump inlet 11a is in fluid communication between the inlet of the pump 12 and the reservoir 15, and a pump outlet 11b is in fluid communication between the outlet of the pump 12 and the inlet of the manifold 20.

In an exemplary description of a common operation of the system 10, prior to activation of the belt 50 during production efforts, the desired location of the cleaning of the belt 50 is identified and the basin with the containment shroud 30 is mounted to the frame of the belt 50 or other support structure, such that the upper limits of the containment shroud 30 do not contact the belt 50. The wear strips 32 of the scrub assembly should minimally contact the belt 50. The manifold 20 is then installed as necessary within the containment shroud 30 such that the nozzles 21 are directed upward. The reservoir 15 is mounted to the ground or support structure directly below the basin 35, such that the reservoir inlet 42 and filter box 40 can be attached and in fluid communication with the drain 36 of the basin 36. A filter 41 is then placed within the filter box 40. The pump 12 is then mounted to the floor or support structure, preferably adjacent to the reservoir 15. The pump inlet 11a is attached to the inlet of the pump 12 and the reservoir 15. The pump outlet 11b is attached to the outlet of the pump 12 and the inlet of the manifold 20.

During operation, when the belt 50 is running, the pump 12 is activated so as to transfer the cleaning solution 60 from the reservoir 15 to the manifold 20. The cleaning solution 60 then exits through the nozzles 21 and directly onto the belt 50 to aid is dislodging debris from and cleaning the belt 50. Dislodged debris and dirty cleaning solution are the collected in the basin 35 and then down through the drain 36. The filter 41 in the filter box 40 aids in filtering the debris from the dirty cleaning solution to produce the return cleaning solution 65, which then enters the reservoir 15 through the reservoir inlet 42.

Downstream from the nozzles 21 is the scrub assembly. The wear strips 32 at the end of each of the scrub arms 31 of the scrub assembly further contacts the belt 50 and provides a scrubbing effect to the belt 50 as the belt 50 travels thereagainst. The spring 34 biases the elongated plate 33 and the scrub arms 31 upwards towards the belt 50. Any further dislodgement of debris is also collected in the basin 35.

In certain embodiments, the cleaning solution 60 can be water or a chemical cleaning solution. All portions of the system 10 that are in contact with the cleaning solution 60 are preferably fabricated out of an inert, resilient, and easily cleanable material, such as stainless steel or plastic. The nozzles 21 can be fixed or movable. The wear strips 32 of the scrub assembly can be replaced as needed when worn down or not able to contact the belt 50 effectively. The filter 41 is removable and can be replaced as needed. The size and material of the filter 41 can be determined by necessity of the return cleaning solution 65 composition, as well as the size of debris to be filtered out.

The pump 12 is envisioned to be electrically-operated and is equipped with a power cord 70 that is connected to an electrical power source 75 such as an electrical receptacle as shown, preferably of the ground fault interrupter (GFI) type. The electrical power source 75 may be the same power source that operates the belt 50. The pump 12 may be provided with a power switch 80 that allows the pump 12 to be turned off, should it not be needed and thus allows continuous operation of the belt 50 alone.

Referring now to FIG. 3, an electrical schematic of the conveyor belt cleaning system 10, according to the preferred embodiment of the present invention is shown. Incoming power from the electrical power source 75 is provided by the power cord 70. The power cord 70 is provided with a grounding connection 85 for personnel safety. The power is then switched before being passed to the pump motor 90. The pump motor 90 would be rated for continuous duty. Finally, it is noted that the pump motor 90 may be wired in a parallel fashion with other electrical components of the belt 50 system, such that all components are energized and de-energized at the same time such that they operate as a synchronous unit. The power switch 80 may still be present to allow for disconnecting of the conveyor belt cleaning system 10 should it not be desired or for maintenance and repair capability.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A conveyor belt cleaning system, comprising:
   a reservoir retaining a cleaning solution;
   a manifold delivering the cleaning solution to a conveyor belt, the manifold includes a plurality of nozzles, each directed towards the conveyor belt;
   a pump transferring the cleaning solution from the reservoir to the manifold, the pump is mounted to a ground or other support structure adjacent to the reservoir in electrical communication with an electrical power source;
   a scrub body contacting the conveyor belt;
   a basin mounted to the frame of the conveyor belt directly subjacent to an area for cleaning the conveyor belt;
   a containment shroud collecting a quantity of dirty cleaning solution, the containment shroud is mounted to a top perimeter of the basin, the containment shroud flares vertically outward about a perimeter, such that an upper edge thereof has a plurality of wider dimensions than a lower edge;
   a filter cleaning the dirty cleaning solution to produce a quantity of return cleaning solution for transfer back to the reservoir;
   a filter box located outside of the basin, the filter box includes a filter box inlet side that is in fluid communication with the drain; and
   a pair of scrub arms rigidly attached to an elongated plate at a bottom end thereof and are also of a similar width thereto.

2. The conveyor belt cleaning system, according to claim 1, wherein the reservoir is mounted to or resting on a floor nearby the conveyor belt.

3. The conveyor belt cleaning system, according to claim 1, wherein the conveyor belt is 2 feet long.

4. The conveyor belt cleaning system, according to claim 1, wherein the basin has an open top, sidewalls, and a bottom, and has a width that is slightly greater than a width of the conveyor belt.

5. The conveyor belt cleaning system, according to claim 1, wherein the basin is sloped towards a drain.

6. The conveyor belt cleaning system, according to claim 1, wherein the filter is removably placed within the filter box such that it is also in fluid communication with the drain.

7. The conveyor belt cleaning system, according to claim 1, further comprising a reservoir inlet that is a fluid conveyance feature that has a first side in fluid communication with a filter box outlet side.

8. The conveyor belt cleaning system, according to claim 7, wherein a second side of the reservoir inlet is in fluid communication with the reservoir.

9. The conveyor belt cleaning system, according to claim 1, wherein the containment shroud includes a perforated mesh bottom within the perimeter.

10. The conveyor belt cleaning system, according to claim 1, wherein the containment shroud includes an open bottom within the perimeter.

11. The conveyor belt cleaning system, according to claim 1, wherein a height of the containment shroud terminates prior to contact with the conveyor belt.

12. The conveyor belt cleaning system, according to claim 1, wherein the elongated plate has a width equal to or slightly greater than the width of the conveyor belt and resides fully within the containment shroud.

13. The conveyor belt cleaning system, according to claim 1, wherein the pair of scrub arms are each oriented at a forward angle relative to perpendicularly vertical from the elongated plate.

14. The conveyor belt cleaning system, according to claim 1, wherein a pump inlet is in fluid communication between the inlet of the pump and the reservoir and a pump outlet is in fluid communication between an outlet of the pump and an inlet of the manifold.

15. The conveyor belt cleaning system, according to claim 1, wherein the electrical power source includes a ground fault interrupter.

16. The conveyor belt cleaning system, according to claim 1, wherein the pump includes a continuous duty pump motor.

* * * * *